March 10, 1931. W. H. BLAKELY 1,796,074
FLOAT SWITCH
Filed June 3. 1927 3 Sheets-Sheet 2
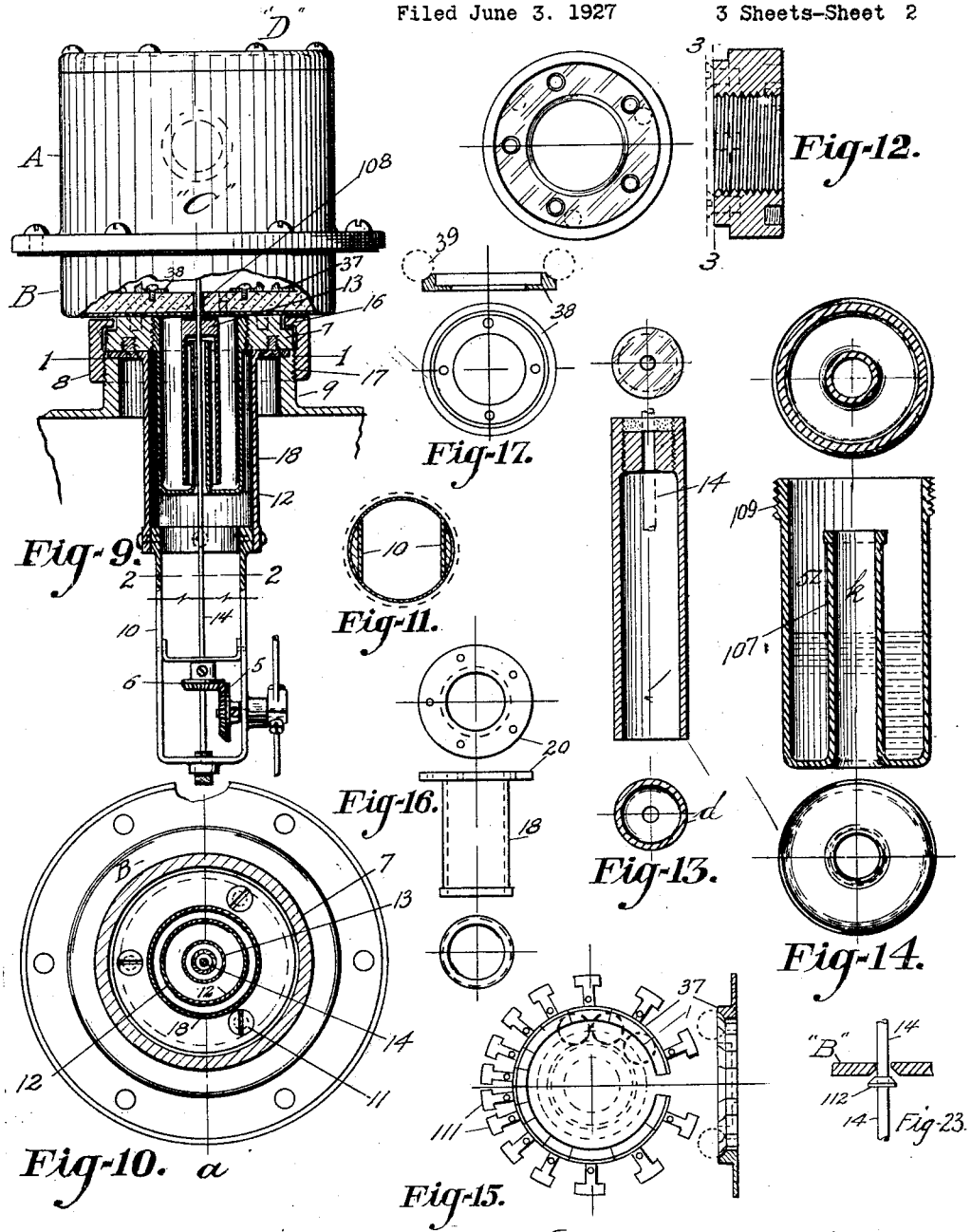
William H. Blakely
INVENTOR.
BY George A. Prenst
ATTORNEY.

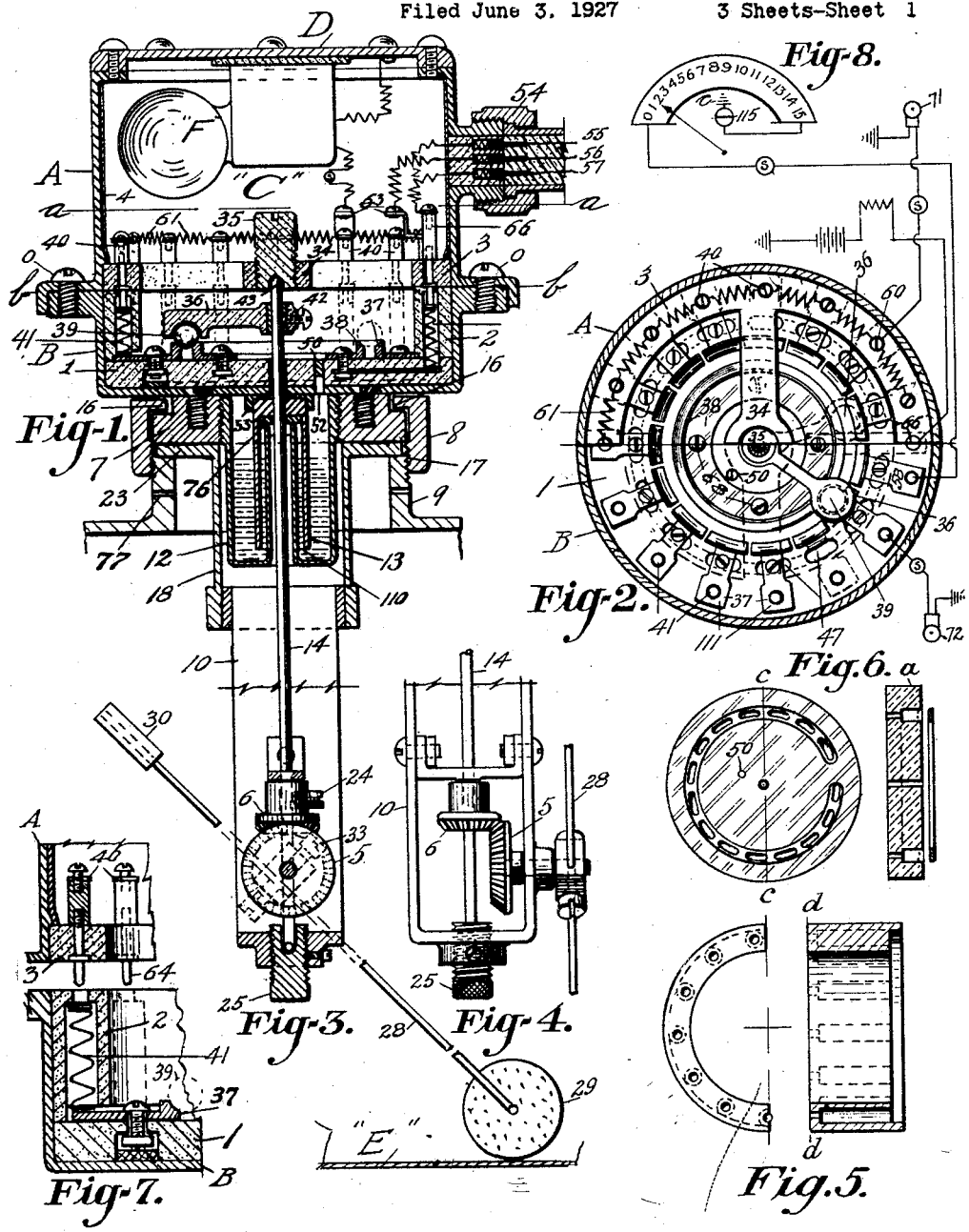

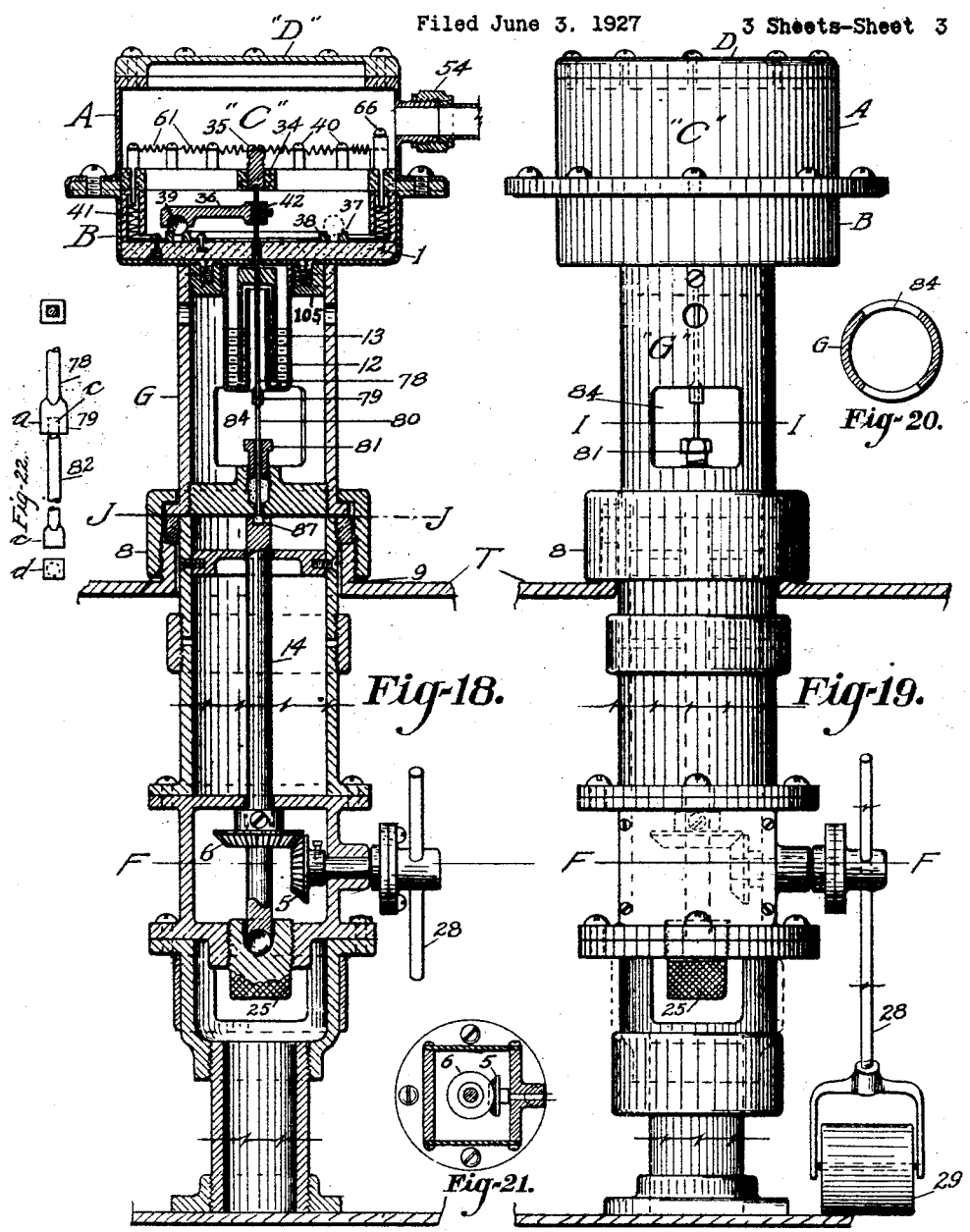

Patented Mar. 10, 1931

1,796,074

UNITED STATES PATENT OFFICE

WILLIAM H. BLAKELY, OF TULSA, OKLAHOMA

FLOAT SWITCH

Application filed June 2, 1927. Serial No. 196,337.

My invention consists in new and useful improvements in electric liquid tank gauges, and while primarily intended for use on gasoline tanks, for motor vehicles, it may be employed with equal advantage in connection with other tanks, such as oil storage tanks, gasoline filling stations, plants and refineries.

It is the object of my invention to provide an electrically operated liquid gauge adapted to be used for measuring gasoline and other inflammable and highly volatile liquids, which will eliminate all fire hazards heretofore prevalent in the use of gauges of this type, and in designing my improved device, I have taken into consideration, simplicity of construction and cost of manufacture. With my improved construction, the points of electrical contact are entirely sealed off with mercury against gases which might enter the chamber containing said electrical parts.

A further advantage of my invention is the ready accessibility of all parts for repairs and adjustments.

A still further object of my invention is to provide a device which will automatically warn the operator when the tank is about to become empty or to overflow, which may be accomplished either by the use of a series of lights or bells, electrically connected with the mechanism.

With the above and other objects in view which will appear as the description proceeds, my invention consists in the novel features herein set forth, illustrated in the accompanying drawings, and more particularly pointed out in the appended claims.

Referring to the drawings, in which numerals of like character designate similar parts throughout the several views, Fig. 1 is a longitudinal sectional view of the upper portion of my gauge placed on a gasoline tank.

Fig. 2 is a double transverse section, the upper half being taken on line a—a, and the lower half on line b—b of Fig. 1.

Figs. 3 and 4 are sectional and perspective views respectively, of the float control mechanism at right angles to each other.

Figs. 5 and 6 are details of the insulation used in the container.

Fig. 7 is an enlarged detail view in section, through the outer edge of the container shown in Fig. 1, showing the means for making contact between the electrical elements in said container.

Fig. 8 is a diagrammatic view of a recording meter, showing the wiring to the container, see also Fig. 2.

Fig. 9 is a view in elevation of the container, partly broken away.

Fig. 10 is a sectional view taken on line 1—1 of Fig. 9.

Fig. 11 is a section taken on line 2—2 of Fig. 9.

Fig. 12 shows plan and sectional views of the means for connecting the device to a tank.

Figs. 13 and 14 are detail views of the mercury or liquid seal.

Fig. 15 shows a plan and sectional view of the outer race contact.

Fig. 16 is a detail view of the mercury seal protector.

Fig. 17 shows plan and sectional views of the inner race contact.

Figs. 18 and 19 are sectional and perspective views respectively, showing the construction of my improved gauge for use in pressure tanks.

Fig. 20 is a view taken on line 1—1 of Fig. 19.

Fig. 21 is a reduced section taken on line F—F of Fig. 19.

Fig. 22 is a detail view of a shaft connection, and

Fig. 23 is a view of the operating shaft provided with a collar for sealing the shaft aperture.

In the drawings, T designates a gasoline or other liquid tank provided in its upper surface with an aperture having an upwardly extending cylindrical collar 9, threaded at its upper end as at 17 to engage threads in the coupling member 8, the latter having an inwardly extending flange 16 at its upper end. This flange 16 is adapted to engage a shoulder on the periphery of a cylindrical disk member 7, secured to the container C, whereby said container is held in place on the tank.

This container consists of a base member B, and a cap or cover A adapted to be secured together by means of two adjacent flanges through which a plurality of screws O are adapted to be inserted.

1 represents an insulating disk in the bottom of the base B, to which I secure a series of contacts 37 as clearly shown in Fig. 2. These contacts are arranged in the form of a circle on the upper surface of said disk 1, their inner ends being bent upwardly to form the outer race for the ball member 39, hereinafter referred to more in detail.

Adjacent the contacts 37, and within the circle formed thereby, I provide contacts 38, which form the inner race for said ball member 39. The contacts 37 are made adjustable on the disk 1 by means of slots 47 in said disk, through which screws are adapted to be inserted to hold the contacts in place. The outer end of the contacts 37 are flared as shown in Fig. 2 and loosely support the lower ends of contact springs 41 which extend upwardly therefrom between the insulating walls 2 in said base member, said flared portions allowing for adjustments of the contacts laterally, without affecting their connection with said springs.

In the lower portion of the cap A, I insert an insulating ring 3, in which are secured a plurality of contacts and binding posts 40 adjacent the respective contacts 37 in the base member, and adapted to be placed in electrical contact therewith by means of plugs 64 which engage the upper ends of said springs 41. These binding posts are arranged in circuits by a plurality of resistance coils 61. Extending across the center of this ring 3, is a cross bar 34 apertured intermediate its ends to receive an adjusting thumb screw 35, which will be hereinafter referred to.

18 represents a cylindrical protector or yoke support, flanged outwardly at its upper extremity to engage the upper edge of the tank collar 9, when said yoke support and yoke 10 secured to the lower end thereof, are inserted in said tank. 14 designates a vertically extending shaft rotatably supported in said yoke and engaging said thumb screw 35 at its upper extremity, and an adjusting bearing 25 at the lower end of said yoke at its lower extremity. At the upper end of this shaft 14, which is insulated to avoid short circuit, I provide an arm 36 which supports the rotating ball 39, heretofore referred to. Just above the lower end of the shaft 14, I secure a beveled gear 6 which is adjustably mounted thereon by means of a set screw 24, said bevel gear 6 being adapted to operatively engage another bevel gear 5 mounted in the lower end of said yoke 10, at right angles to said gear 6, as clearly shown in Fig. 4. At the outer end of the short horizontal shaft which supports the bevel gear 5, I secure a float rod 28 having at its lower extremity a float 29, and at its upper extremity, a counter weight 30, whereby when said float is raised or lowered, in said tank, the rod 28 will operate the bevel gear 5 which in turn will cause the bevel gear 6 to rotate and with it the shaft 14 to revolve the arm 36 carrying the ball 39 around the ball races 37 and 38.

In order to prevent the gases from the tank T escaping upwardly along the shaft 14, into the electrical contact container C, I provide a mercury seal which consists of a mercury container 12, secured to the base B of the container. The bottom of this container extends upwardly therein into a tube 107 as clearly shown in Fig. 14, being open at its upper extremity, to allow such shaft 14 to pass upwardly therethrough. 13 represents another tube closed at its upper extremity except for an aperture through which the shaft 14 passes, and open at its lower extremity at 110, whereby the same may be inserted in said container 12, surrounding the upwardly extending tube 107, the lower end of said tube 13 being submerged in the liquid in said container. The mercury container 12 and the inverted cup or tube 13 may be composed of glass, composition or other suitable material for withstanding the effects of mercury, and it will be noted that the aperture in the closed end of the tube 13 is drilled a size which will make a forced fit upon the shaft 14, to insure a perfect seal. 53 represents a felt washer interposed between the upper end of the tube 13 and the container C, while 76 is a similar washer mounted within the tube 13 where the same abuts the upper edge of the upwardly extending tube 107 of the container 12.

In Fig. 1, F represents a bell or signal mounted in the container C and in electrical connection with the device, whereby when the tank is about to become empty, the circuit will be closed to ring the bell warning the driver, as will be hereinafter referred to. D represents a cover plate for the cap of the container which may be removed when desired to gain access to the electrical parts of the device. 54 represents a socket in the side wall of the cap A through which the wires 55, 56, and 57 are adapted to be inserted, and retained in place.

The operation of my device is as follows, referring to Figs. 8 and 2, which, together show the wiring plan of the gauge, assuming that there are fifteen different contacts 37, each representing one gallon of gasoline or other liquid. As heretofore stated, the changing of the liquid level in the tank, causes the float 29 to rise and fall, thus rotating the shaft 14, and with it the arm 36 which causes the ball 39 to revolve around the contact races 37 and 38. In the position shown in Fig. 2, the ball 39 being in contact with the second contact of the circuit would indicate that there were two gallons of gasoline in the tank, and at the same time, it would energize the line leading to the bell 72, to warn the operator of the vehicle that the gasoline in the tank was getting low. As the tank is filled the ball 39 will rotate around the contacts until it reaches the contacts designated by the number 60, which will energize the bell 71 to warn the station operator that the tank is nearly full. As the car is driven and the gasoline level lowers, the ball will rotate in the reverse direction, and as it engages each contact 37, throughout its revolution, the quantity of gasoline in the tank will be indicated on the meter.

The structures shown in Figs. 18 and 19 are intended for use in large tanks such as storage tanks and filling station tanks, and while the operation and construction of the device shown here, are practically the same as those heretofore described, there are several modifications in the details of construction. For instance, instead of the protector 18 and the yoke 10, a heavy casing G is employed for supporting the working parts of the device and protecting the mercury container. This casing G is provided towards its upper end with apertures 84 to permit the adjustment of the rod 80 which connects the shaft 14 with the arm 36 supporting the rotating ball 39.

From the foregoing it is believed that my invention may be clearly understood without further description, it being borne in mind that numerous changes may be made in the details of construction without departing from the spirit of the invention as expressed in the following claims.

What I claim and desire to secure by Letters Patent is:—

1. An electric liquid gauge, comprising a float operated rotary shaft, one end of which projects into a container, a series of electrical contacts in said container, means on said shaft for completing the circuit between said contacts, and a liquid seal surrounding said shaft, for preventing the leakage of vapors into said container, said liquid seal comprising a ring-shaped container of mercury resisting material, having integral inner and outer walls, said inner walls extending upwardly from the bottom in the form of a tube, open at its upper end and adapted to surround said rotary shaft, an inverted cup of similar material tightly secured at its upper end around said shaft, and adapted to be inserted in said container, over said tube, its lower end being submerged in the liquid in said container to seal the shaft.

2. An electric liquid gauge as claimed in claim 1, wherein said ring-shaped container and inverted cup are composed of glass, and a protector for said container.

3. An electric liquid gauge comprising a float operated rotary shaft carried in a supporting yoke, the upper end of said shaft projecting into a container, the other end being mounted in a vertically adjustable bearing, provided at the lower extremity of said yoke, a series of electrical contacts in said container, means on said shaft for completing the circuit between said contacts, and a liquid seal surrounding said shaft for preventing the leakage of vapors into said container.

4. In an electric liquid gauge comprising a float operated rotary shaft, one end of which projects into a casing, a base member and cover for said casing, an insulating disc in said base member supporting a plurality of contacts, means for adjusting said contacts on said disc, an insulating member in said cover provided with a plurality of binding posts arranged in circuit with each adjacent one of said contacts, said binding posts being provided with plugs, adapted to engage sockets in said base member in electrical communication with said contacts for connecting said binding posts with the respective contacts, and means operable by said rotary shaft, engaging said contacts for making and breaking the circuit.

5. Apparatus as claimed in claim 4 wherein said contacts are flared at their outer ends, connections loosely engaging said flared portions at one end and adapted to receive plugs at the other end, said plugs being secured to said binding posts.

6. Apparatus as claimed in claim 4 wherein said contacts are flared at their outer ends, spring connections loosely engaging said flared portions at one end and adapted to receive plugs at the other end, said plugs being secured to said binding posts.

In testimony whereof I affix my signature.

WILLIAM H. BLAKELY.